United States Patent [19]

Curhan et al.

[11] Patent Number: 4,990,553
[45] Date of Patent: Feb. 5, 1991

[54] BASING CEMENT CONTAINING SILICON ETHER

[75] Inventors: John D. Curhan, Newtonville; David H. Fox; Emery G. Audesse, both of Beverly, all of Mass.

[73] Assignee: GTE Products Corporation, Danvers, Mass.

[21] Appl. No.: 178,178

[22] Filed: Apr. 6, 1988

[51] Int. Cl.$^5$ .............................................. C08K 5/54
[52] U.S. Cl. .................................... 524/261; 524/264; 524/263
[58] Field of Search ...................... 524/261, 264, 263

[56] References Cited

U.S. PATENT DOCUMENTS 3,876,559 4/1975 Jaffe ........................... 252/511
3,957,719 5/1976 MacKenzie Jr. .............. 524/264

FOREIGN PATENT DOCUMENTS 0044673 1/1982 European Pat. Off. ............ 524/264
175850 10/1983 Japan .................................. 524/261

Primary Examiner—Morton Foelak
Assistant Examiner—Dennis R. Daley
Attorney, Agent, or Firm—Martha A. Finnegan

[57] ABSTRACT

A basing cement composition is disclosed. The basing cement composition of the invention includes an insulating binder, an inert filler material, a solvent, and silicone ether. The silicone ether is included in the basing cement composition in an amount greater than 0, up to about 5 weight percent. Preferably, the silicone ether is added to the basing cement composition in solution form.

14 Claims, 1 Drawing Sheet

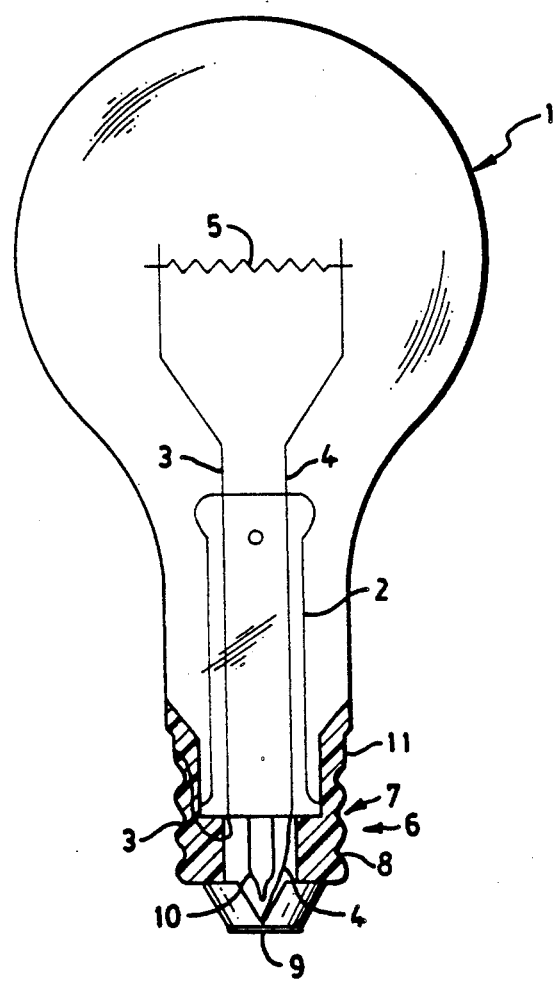

BASING CEMENT CONTAINING SILICON ETHER

TECHNICAL FIELD OF THE INVENTION

This invention relates to a cement used to form a bond between glass and another material. More particularly, this invention relates to a cement used to form a bond between glass and metal in electric devices such as electric lamps of the type having an enclosing envelope with a metal base attached thereto.

BACKGROUND OF THE INVENTION

Conventional basing cements for electric lamps are composed of an inert filler material, an insulating binder, and a processing agent or vehicle. Typical fillers used in such basing cements include marble flour, ground mineral barytes, and titanium dioxide. The binder materials may be shellac, rosin, various synthetic resins, etc., or mixtures thereof. Various processing agents (solvents) can be used, the most common of which is alcohol.

Such conventional basing cements ordinarily employed to join a metal base to a glass bulb of an electric lamp are generally satisfactory for normal indoor applications. However, when lamps so based, are used outdoors, in areas of high humidity, in other harsh environments, or used on long life lamps, such as those having a lifetime over 1,500 hours, the conventional basing cements frequently fail with the base of the lamp coming loose.

SUMMARY OF THE INVENTION

In accordance with the present invention there is provided a basing cement comprising an insulating binder, an inert filler material, a processing agent, and a silicone ether, said silicone ether being present in said basing cement in an amount greater than 0 and less than or equal to about 5 weight percent of said basing cement. The basing cement of the present invention provides a glass-metal bond which exhibits improved moisture resistance and strength.

BRIEF DESCRIPTION OF THE DRAWINGS

In the drawings:

The FIGURE shows a cross-sectional view of a lamp including the basing cement of the present invention.

For a better understanding of the present invention, together with other and further objects, advantages, and capabilities thereof, reference is made to the following disclosure and appended claims in conjunction with the accompanying drawing.

DETAILED DESCRIPTION

The present invention is directed to an improved, economical basing cement which improves the moisture resistance and strength of the cemented bond between the glass envelope and metal base of an electric lamp.

In accordance with the present invention, it has been found that the addition of up to about 5 weight percent silicone ether to a conventional basing cement composition improves the ability of a glass-metal bond formed by the basing cement to withstand a high moisture, high temperature environment, and/or long lamp life. Preferably, the silicone ether is included in an amount up to about 2 weight percent of the total basing cement composition; and most preferably about 0.8 to about 1.0 weight percent silicone ether.

The term "silicone ether", as used herein, refers to synthetic polymers characterized by the following formula:

$$[(RO)_n SiO_{(4-n)/2}]_m$$

where $n = 1, 2,$ or $3$ and $m$ is greater than or equal to 2. A silicone ether has a repeating silicon-oxygen backbone and has OR groups attached to a significant portion of the silicon atoms by silicon-oxygen bonds. The silicone ether compound contains no direct silicon-carbon, silicon-hydrogen, or silicon-halogen bonds. In the OR group, O represents oxygen and R represents an organic group including, for example, methyl; ethyl; longer alkyl, e.g., $C_3$–$C_8$; phenyl; vinyl; etc.; and halogenated organic groups, e.g., fluoralkyl, etc. In silicone ethers containing more than one OR group, the R group of each OR group may be the same or different.

Preferably the silicone ether included in the basing cement composition is a silicone ether having up to about 16 repeat units. In a most preferred embodiment, the silicone ether has up to about 8 repeat units.

In a preferred embodiment of the present invention, the silicone ether is added to the basing cement composition in the form of a solution. Such solution comprises silicone ether and a volatile solvent, such as an alcohol. Such solution may further include various additives, e.g., anti-oxidants, adhesion promoters, and/or pigments, to obtain specific properties. The concentration of the silicone ether in the solution is preferably from about 0.6 to about 1.0 weight percent. Most preferably, the solution contains from about 0.7 to about 0.9 weight percent silicone ether.

Preferred solvents are organic alcohols, e.g., alkanols such as methanol, ethanol, propanol, etc.

The addition of a solution comprising a silicone ether, such as ethoxymethoxy silicone, and a volatile solvent, such as methanol, to a typical basing cement significantly increases the average base torque strength of the cement while not adversely affecting the other physical properties of the cement.

The following composition represents a preferred embodiment of the basing cement of the present invention and is given to enable those skilled in this art to more clearly understand and practice the present invention. This example should not be considered as a limitation upon the scope of the present invention but merely as being illustrative and representative thereof.

EXAMPLE

| Material | Weight Percent |
|---|---|
| phenolic resin | 3 |
| shellac (dry) | 3 |
| rosin | 2 |
| marble flour | >80% |
| Chemlok 607 | 0.8 |

The components listed in the foregoing Example are admixed to form the described basing cement composition.

The Figure illustrates a use of the present invention as applied to a lamp. While the lamp shown in the Figure is an incandescent type lamp, the basing cement of the present invention may be useful to attach a metal base to a glass envelope for other types of lamps. Also, the configuration of the lamp envelope is not limited to the shape shown in the Figure.

Referring to the Figure with more particularity, there is shown an incandescent lamp including a sealed glass envelope 1 containing a glass stem 2 through which lead-in wires 3, 4 extend to support the filament 5. The envelope may be filled with an inert gas, such as the rare gases or nitrogen, at a pressure generally slightly below atmospheric although a higher pressure is often used. Alternatively, all or nearly all of the gases may be removed from the envelope, producing a nearly perfect vacuum inside.

The base is of the customary screw-type, having a cylindrical metal shell 7 with screw threads 8 thereon, and an insulating plug sealed to the bottom of the shell and supporting an eyelet contact 9. One lead wire 3, is connected to the top of the shell 7, and the other lead wire 4, to the eyelet contact 9.

The base 6 is held to the envelope 1 by the basing cement of the present invention 11 between the base 6 and the lamp envelope 1.

In applying the basing cement, the basing cement 11 is placed around the inside of the base 6. At this time, the cement resembles putty in its consistency. The glass bulb 1 is then positioned in the base and the curing operation is begun. In the process of curing or setting the cement, it is heated for a period of approximately 18 seconds and reaches a temperature of about 240° C. It will be apparent to the skilled artisan that the specific time-temperature combination described for curing or setting the cement may be substituted by any combination of time and temperature sufficient to remove the alcohol from the cement and cause certain chemical reactions typical to a thermo-setting cement to take place.

A test was conducted to compare the performance of basing cement of the present invention to that of a typical basing cement when used to attach a metal base to a lamp envelope.

A typical basing cement composed of about 4 weight percent phenolic resin, about 3 weight percent shellac, about 3 weight percent rosin and about 90% marble flour filler material was subjected to a high temperature (100° C.), high humidity (100%, i.e., in boiling tap water) environment test. The average base torque strength of the glass-metal seal formed using this typical basing cement formulation, after 0.25 hours of boiling in such environment, was 23.7 in-lb.

After operating the same number of hours under identical environmental conditions, approximately 100 lamps including a basing cement in accordance with the present invention composed of about 4 weight percent phenolic resin, about 3 weight percent shellac, about 91 weight percent rosin, less than about 1 weight percent marble flour filler material, and less than about 1 weight percent Chemlok 607 had an average base torque strength of 42.4 in-lb. Chemlok 607 is a composition including about 10 weight percent ethoxymethoxy silicone and about 90 weight percent methanol. Chemlok 607 is manufactured by Lord Corporation, Chemical Products Group, 2000 West Grandview Boulevard, P.O. Box 10038, Erie, Pennsylvania 16514-0038.

In the foregoing tests, base torque strength was evaluated by holding the base firmly while turning the lamp glass envelope until the base and bulb separated.

While there has been shown and described what are at present considered the preferred embodiments of the invention, it will be obvious to those skilled in the art that various changes and modifications can be made therein without departing from the scope of the invention as defined by the appended claims.

What is claimed is:

1. A basing cement composition comprising an insulating binder, an inert filler material, a processing agent, and silicone ether having the formula:

wherein n is 1, 2, or 3; m is greater than or equal to 2; and each R represents a carbon containing organic group which may be the same or be different, said silicone ether being present in said basing cement composition in an amount greater than 0 and less than or equal to about 5 weight percent.

2. A basing cement composition in accordance with claim 1 wherein said silicone ether is included in solution form, said solution comprising silicone ether and a volatile solvent.

3. A basing cement composition in accordance with claim 2 wherein said solvent is alcohol.

4. A basing cement composition in accordance with claim 3 wherein said binder comprises a phenolic resin, shellac, and rosin.

5. A basing cement composition in accordance with claim 4 wherein said inert filler material comprises marble flour, ground mineral barytes, titanium dioxide, or mixtures thereof.

6. A basing cement in accordance with claim 5 wherein said processing agent comprises alcohol.

7. A basing cement composition in accordance with claim 6 wherein said silicone ether comprises ethoxymethoxy silicone.

8. A basing cement composition in accordance with claim 7 wherein said ethoxymethoxy silicone is present in said basing cement composition in an amount greater than 0 and less than or equal to about 2 weight percent.

9. A basing cement composition in accordance with claim 8 wherein said ethoxymethoxy silicone is present in said basing cement composition in an amount from 0.8 to 1.0 weight percent.

10. A basing cement composition comprising about 4 weight percent phenolic resin, about 3 weight percent shellac, about 91 weight percent rosin, less than about 1 weight percent marble flour filler material, and less than about 1 weight percent ethoxymethoxy silicone.

11. A method for improving the moisture resistance of a basing cement for use in an electric device, said method comprising:

adding a silicone ether having the formula:

wherein n is 1, 2 or 3; m is greater than or equal to 2; and each R represents a carbon containing organic group which may be the same or be different, in an effective moisture resistance improving amount, to a basing cement formulation comprising an insulating binder, an inert filler material, and a processing agent.

12. A method in accordance with claim 11 wherein said effective amount of silicone ether is greater than zero and less than or equal to about 5 weight percent.

13. A method in accordance with claim 12 wherein said silicone ether is ethoxy methoxy silicone.

14. A method in accordance with claim 13 wherein said effective amount of ethoxy methoxy silicone is from about 0.8 to about 1.0 weight percent.

* * * * *